Oct. 4, 1927.
G. C. THOMAS, JR
1,644,292
CABLE CONNECTER
Filed Jan. 22, 1924
2 Sheets-Sheet 2
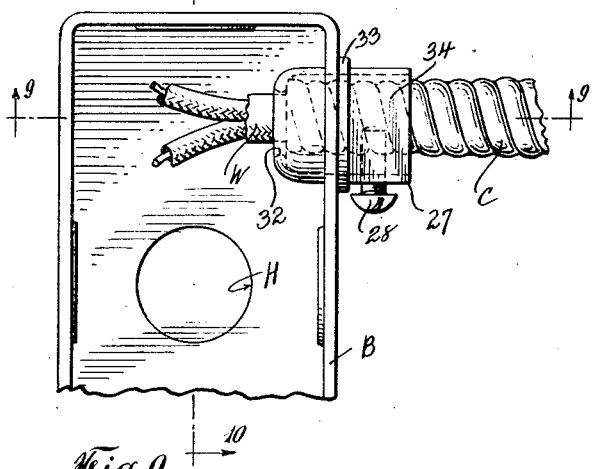
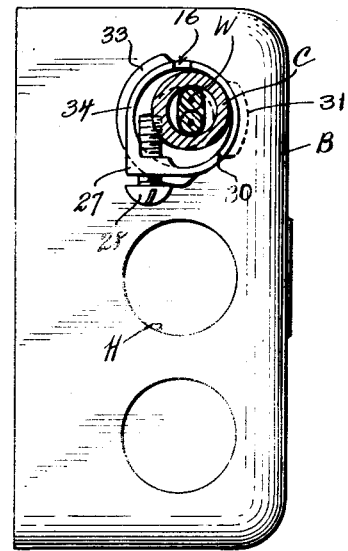
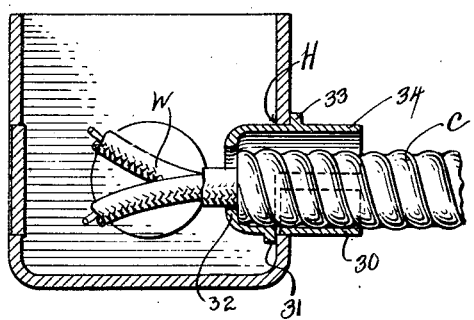
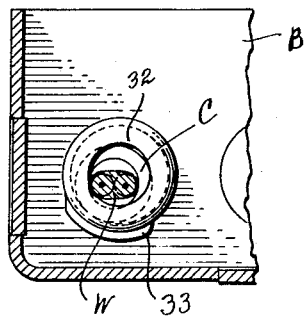
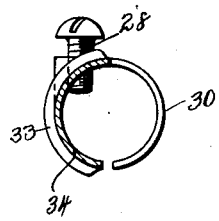
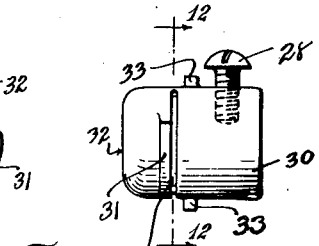
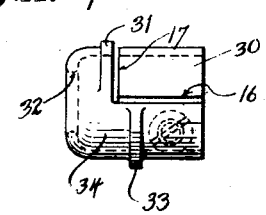
INVENTOR
George C. Thomas Jr.
BY
Bohleber & Ledbetter
ATTORNEYS Patented Oct. 4, 1927.

1,644,292

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,778.

This invention relates to cable connecters for use in joining electric cables to outlet box fixtures and the like.

An object of the invention is to produce an improved cable connecter of simple and preferably one piece structure which is capable of being manufactured at low cost and which positively anchors a cable to standard round knock-out holes in the usual run of electric fixture boxes such as cable and outlet boxes, switch and fuse boxes, and others.

The accompanying drawings illustrate preferred forms of the invention, the construction of which may be suitably varied or modified to meet the manufacturer's and user's requirements without departing from the scope and principle of my invention.

Figure 1 illustrates a top view of an electric fixture box with a cable joined thereto by the use of my improved connecter; and Figure 2 is an outside elevation thereof as projected from the side of Figure 1.

Figure 3 illustrates a longitudinal section on the line 3—3 of Figure 1; and Figure 4 illustrates an inside view developed on the line 4—4 of Figure 1.

Figure 5 is a cluster view of the cable connecter illustrating the three major projections thereof.

Figure 6 shows a sectional view taken on the line 6—6 of Figure 5.

Referring now to Sheet 2 of the drawings for the remaining figures illustrating the invention, there is shown a modified form of the cable connecter.

Figure 7 shows a top view of a box with a cable joined thereto by use of the improved connecter; and Figure 8 illustrates an outside view projected from Figure 1.

Figure 9 illustrates a longitudinal sectional view through the connecter as developed on the line 9—9 of Figure 7; and Figure 10 illustrates an inside view of the box and connecter parts as observed from the line 10—10 of Figure 9.

Figure 11 shows a cluster view of the connecter illustrating three major projections thereof.

Figure 12 illustrates a cross sectional view on the line 12—12 of Figure 11.

Referring now more particularly to Sheet 1 of the drawings for a detailed description of the invention, and in reference to the structure of the cable connecter itself, there is shown a connecter in the form of a sleeve 14 open at one end and restricted at the other end by a solid full circular bushing 15. The end of a cable C is inserted into the sleeve 14 and rests against the bushing 15 with the cable wires W passing through the bushing which provides a rounded or ovaled aperture for the passage of the wires therethrough to prevent abrading or damaging of the wire insulation.

The sleeve 14 is provided with a longitudinal split 16 which runs from the open sleeve end along the wall of the sleeve toward the bushing end thereof, and joins with a radial split 17 extending partly around the sleeve near the end thereof. The combined longitudinal split 16 and radial split 17 thus partially severs the sleeve wall into two portions, the one portion 14 of which remains rigid and integrally intact with the bushing 15, while the severed cylindrical wing or expandible circular portion 18 is rendered flexible and expansible relatively to the rigid part 14 by virtue of being partly severed from the bushing end of the sleeve. Observing how the cylindrical wall section 14 is rigid and braced by the full circular bushing 15, and how the partly severed circular wall 18 in the nature of a wing is flexible, it will be appreciated how, as later explained, the connecter is inserted, expanded and anchored in a box hole and how it simultaneously secures a cable in place by use of one screw only.

A rib abutment 21 is cast or otherwise made integral on the sleeve, and in the present instance is shown on the rigid wall section 14 and acts as a stop which shoulders and bears against the outside of the cable box B when the cable connecter is inserted in the box knock-out hole H. This rib 21 preferably extends part-way only around the rigid wall 14 of the sleeve and strengthens or stiffens the said sleeve on the rigid part thereof, but more particularly the rib functions as a stop to properly position the connecter in the box. This abutment rib 21 is preferably spaced back from the end of the sleeve connecter sufficiently far as will enable the said sleeve to be introduced into the box far enough for the radial split 17 to pass substantially beyond the inner box wall surface of the said box. Abutment ribs 22 and 23 are formed on the inner edge of the cylindrical expandible section 18 adjacent the radial split 17, and it is observed that sleeve section, the flexible section 30 is left with an added degree of expansibility.

This sleeve connecter is first introduced into the box by sidewise or angular insertion whereby the inside box rib 31 is hooked around behind the knock-out box edge. The connecter is straightened up in the box and a cable end C is inserted whereupon the clamp screw 28 is driven home by turning it up against the cable. When the screw 28 binds against the cable C the threads of the screw bite tangentially into the cable to secure it within the sleeve. At the same time the cable C thrusts against the flexible wall portion 30 whereupon it expands outwardly against the knock-out hole H producing such expanding pressure as will tightly anchor the connecter in the box.

In general, the position of the clamp screw and the one or more abutment ribs may be varied or changed to better suit various requirements; as for example the screw may be placed on the flexible portion with or without the ribs, and similarly the ribs may be so disposed that one or more are utilized as abutments on the outside of the box and one or more as abutments on the inside of the box.

I have therefore produced a connecter having a full fashioned full circular or solid bushing which is not mutilated or split to render the sleeve expandible and so the wires are not liable to wear and damage. The sleeve is made with two intersecting splits, one radial or circumferential and the other longitudinal, and these splits do not cut through the bushing. The sleeve therefore has a rigid portion and an expandible or flexible portion. Inside and outside box hole edge abutments of any suitable character are provided in between which rests the box hole edge. A single clamp screw is mounted on the connecter, projects through the wall thereof, and performs several functions, namely that of holding a cable in the sleeve, and that of simultaneously forcing outwardly the aforesaid flexible portion to expand the connecter against the box hole edge rendering effective the box hole edge abutments which anchors the connecter in the box against longitudinal displacement.

What I claim is:—

1. A connecter comprising a sleeve including a full circular bushing at one end, including mutilating slits which do not cut through the bushion thus rendering flexible a portion of the sleeve, box hole edge abutments on the sleeve, and a screw mounted on the sleeve to bear on a cable and force outwardly on the flexible portion.

2. A connecter as defined in claim 1 wherein the mutilating slits comprise a longitudinal slit leading from one end of the sleeve toward the bushing, and a radial slit paralleling the bushing and connecting with the longitudinal slit.

3. A connecter comprising a sleeve open at one end to receive a cable, a solid full circular bushing at the other sleeve end, said sleeve having a longitudinal and radial split running from the open sleeve end to the bushing and extending partly around the sleeve, a flexible circular portion formed on the sleeve by virtue of the said split which expands in relation to said solid bushing, box hole edge abutments carried by the sleeve and disposed in spaced relation, and a clamp screw threaded through the connecter to screw against a cable in the sleeve and simultaneously expand the flexible portion.

4. A connecter comprising a sleeve open at one end to receive a cable, a solid ring bushing made on the other end, said sleeve having a circumferential split extending part way therearound adjacent the bushing leaving stock attaching the bushing to the sleeve, said sleeve having a longitudinal split extending from the open end thereof to the circumferential split, both splits connecting at their ends which separates the sleeve into rigid and flexible portions, said bushing and rigid portions being joined together as aforesaid by the attaching stock which permits the flexible portion to flex relatively to said bushing and rigid portion, box hole edge abutment means included on the sleeve, and means carried by the sleeve to simultaneously grip a cable and expand the flexible portion to cause said abutment means to engage a box hole edge.

5. A connecter comprising a sleeve open at one end to receive a cable, a solid ring bushing made on the other end, said sleeve having a circumferential split extending part way therearound adjacent the bushing leaving stock attaching the bushing to the sleeve, said sleeve having a longitudinal split extending from the open end thereof to the circumferential split, both splits connecting at their ends which separates the sleeve into rigid and flexible portions, said bushing and rigid portion being joined together as aforesaid by the attaching stock which permits the flexible portion to flex relatively to said bushing and rigid portion, ribs made on the sleeve adapted to engage the edge of a box hole, and a screw carried by the sleeve adapted to grip a cable between it and the sleeve and simultaneously expand the flexible portion.

6. A connecter comprising a sleeve, an inside box wall rib and outside box wall rib on the sleeve, said sleeve provided with a split extending lengthwise passing between said ribs and then extending circumferentially part way around the sleeve and running adjacent one rib thereby dividing the sleeve into expandible parts with one rib located on each part, and a cable clamp screw threaded through the sleeve wall to grip a cable therein and expand the parts.

7. A connecter comprising a sleeve provided with two splits, one split running longitudinally and the other split running circumferentially, the two said splits being connected which results in partially severing the sleeve into a flexible circular wall portion and a substantially rigid portion, said flexible portion being carried on the rigid portion by the sleeve material remaining between the ends of the circumferential split, an abutment means on the rigid portion and abutment means on the flexible portion, and a single operating means on the flexible portion which serves the double purpose of expanding the flexible portion rendering effective both abutment means and simultaneously clamping a cable in the connecter.

8. A connecter comprising a sleeve having a connecting lengthwise and circumferential split which forms the sleeve into rigid and flexible portions, a screw threaded through the sleeve wall with its end inside the sleeve to grip against a cable and simultaneously expand the flexible portion, and spaced box hole edge abutments carried on the rigid portion between which a box hole edge is received.

9. A cable connecter comprising a sleeve, a closed continuous ring bushing at the inner end thereof, said sleeve being provided with a circumferential slit proximate the bushing which slit partially severs the bushing from the sleeve, said sleeve also being provided with a longitudinally extending slit cutting through the sleeve from its outer end and connecting with one end of the circumferential slit, the two slits aforesaid providing a sleeve connecter which includes a rigid bushing carried on a sleeve member the circular wall of which is subject to circumferential contraction and expansion, box hole anchorage means formed on the connecter member to engage a box wall, and operating means carried on the connecter to grip a cable in the sleeve and render effective the anchorage means.

10. A connecter as defined in claim 9 wherein the anchorage means comprise ribs spaced apart a distance equal to the thickness of a box wall adapted to rest therebetween, and said ribs formed on the sleeve remote from the bushing between the circumferential slit and the outer end of the sleeve.

In testimony whereof I affix my signature.

GEORGE C. THOMAS, Jr.

Oct. 4, 1927.
G. C. THOMAS, JR
1,644,293
CABLE CONNECTER
Original Filed Jan. 22, 1924
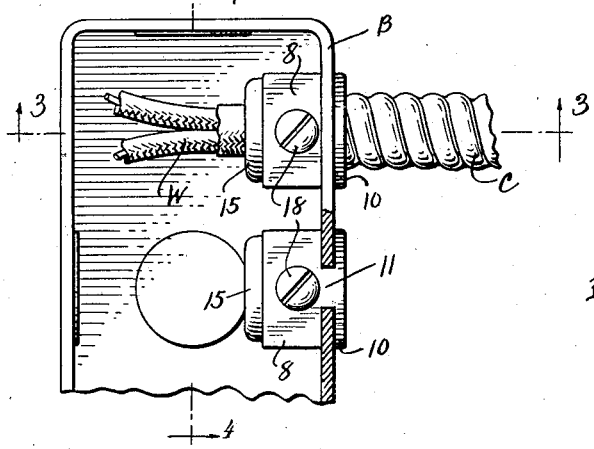
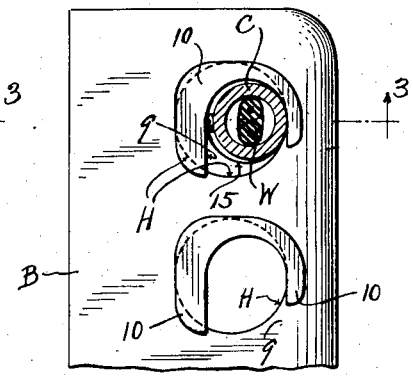
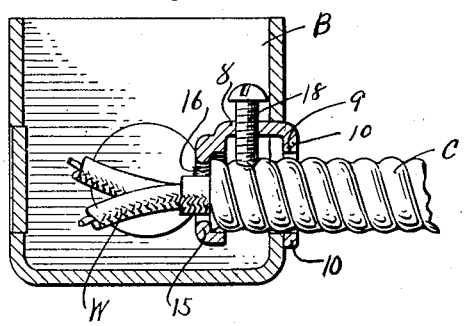
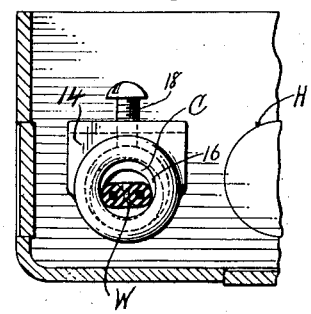
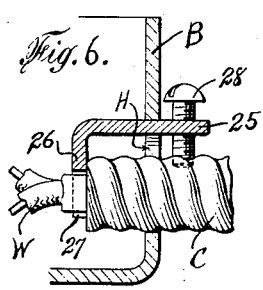
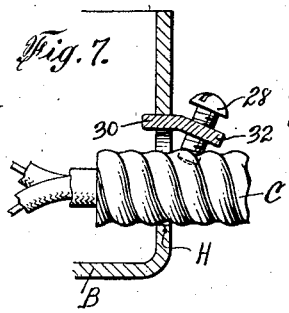
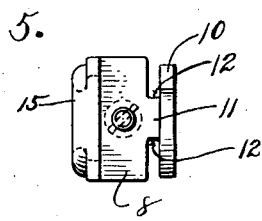
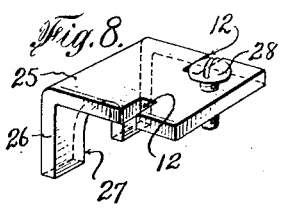
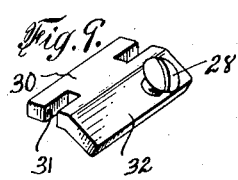
INVENTOR
George C. Thomas, Jr.
BY
Bohlebert + Ledbetter
ATTORNEYS